United States Patent
Hara (10) Patent No.: US 7,425,799 B2
(45) Date of Patent: Sep. 16, 2008

(54) CURRENT DETECTING CIRCUIT (75) Inventor: Takahiro Hara, Himeji (JP)

(73) Assignee: Ikeda Electric Co., Ltd., Himeji-Shi, Hyogo (JP)

( * ) Notice: Subject to any disclaimer, the term of this patent is extended or adjusted under 35 U.S.C. 154(b) by 140 days.

(21) Appl. No.: 10/558,304

(22) PCT Filed: May 31, 2004

(86) PCT No.: PCT/JP2004/007476

§ 371 (c)(1),
(2), (4) Date: Nov. 28, 2005

(87) PCT Pub. No.: WO2005/008873

PCT Pub. Date: Jan. 27, 2005

(65) Prior Publication Data
US 2007/0007904 A1 Jan. 11, 2007

(30) Foreign Application Priority Data
Jun. 13, 2003 (JP) .............................. 2003-169719

(51) Int. Cl.
F02P 3/08 (2006.01)
H05B 37/02 (2006.01)
H05B 39/04 (2006.01)
H05B 41/00 (2006.01)
H02J 7/00 (2006.01)

(52) U.S. Cl. .................. 315/209 CD; 320/166
(58) Field of Classification Search ................ 320/166; 323/282; 363/44; 315/209 R, 209 CD, 242, 315/244, 276, 283, 291

See application file for complete search history.

(56) References Cited

U.S. PATENT DOCUMENTS

| 5,546,300 | A | * | 8/1996 | Lee et al. | ................. 363/132 |
| 5,572,735 | A | * | 11/1996 | Tanikawa | .................... 713/300 |
| 5,689,155 | A | * | 11/1997 | Chung et al. | .............. 315/199 |
| 6,429,604 | B1 | * | 8/2002 | Chang | ...................... 315/244 |
| 6,469,917 | B1 | * | 10/2002 | Ben-Yaakov | ................ 363/44 |
| 2002/0171372 | A1 | * | 11/2002 | Motomura et al. | ...... 315/200 A |

FOREIGN PATENT DOCUMENTS

| JP | 7-231650 A | 8/1995 |
| JP | 10-125484 A | 5/1998 |
| JP | 2000-184702 A | 6/2000 |
| JP | 2003-125582 A | 4/2003 |

* cited by examiner

Primary Examiner—Gary L Laxton
Assistant Examiner—Ramy Ramadan
(74) Attorney, Agent, or Firm—Birch, Stewart, Kolasch & Birch, LLP (57) ABSTRACT The object of the present invention is to provide a current detecting circuit capable of detecting a current flowing to a switching device with high accuracy, with less power loss, with high voltage, and in an insulated form.

A current detecting circuit of the present invention is provided with a charge circuit charging to a capacitor through a current which is proportional to a voltage developed in a choke coil, and a discharge circuit setting a voltage of the capacitor 0V when the current flowing to the switching device is 0, so that the voltage of the capacitor is detected as a value which is proportional to the current flowing to the switching device.

6 Claims, 8 Drawing Sheets

CURRENT DETECTING CIRCUIT

TECHNICAL FIELD

This invention relates to a current detecting circuit, which detects current flowing to a switching device.

BACKGROUND ART

Figure 6:
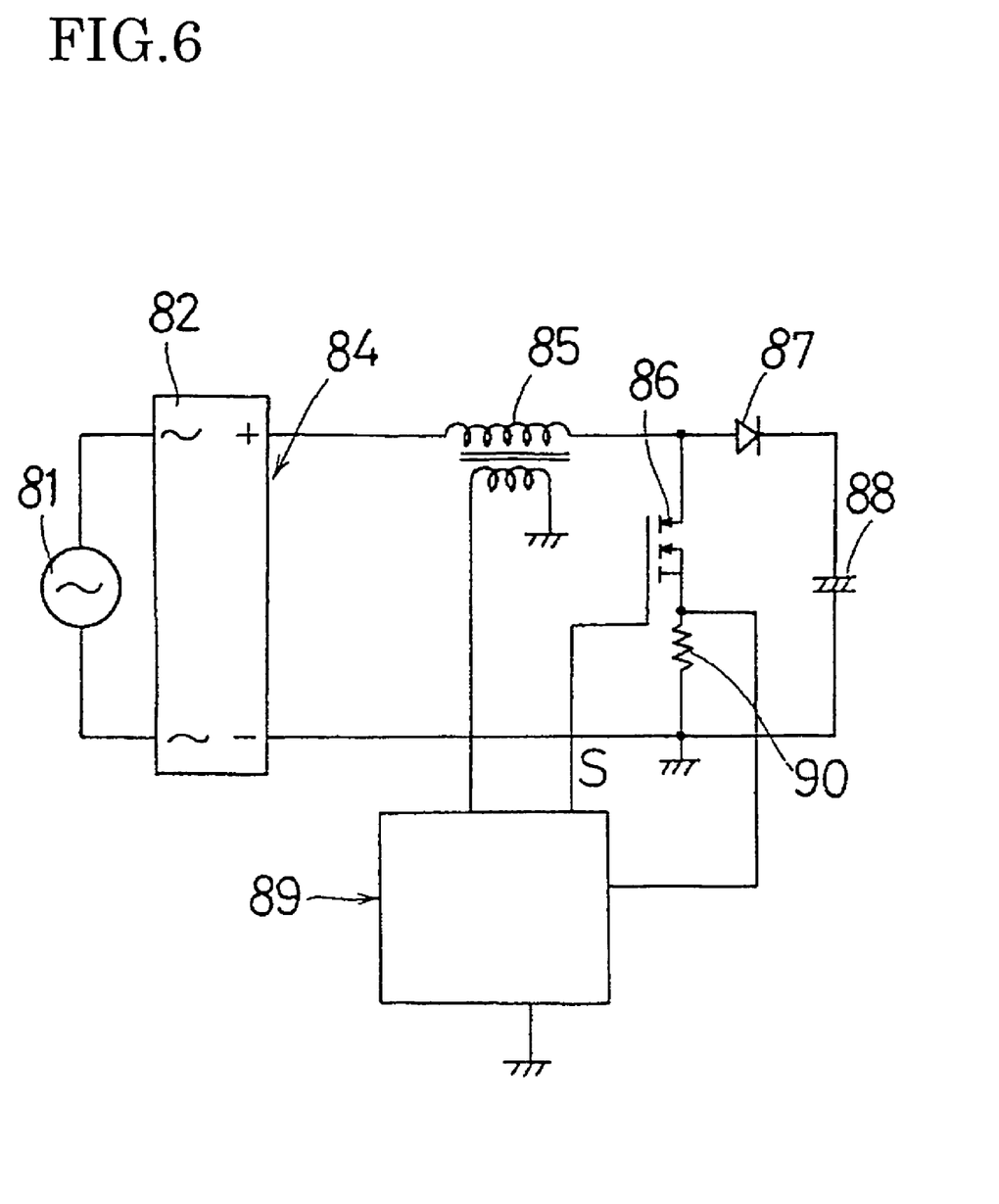
FIG. 6 is a circuit diagram showing a conventional example.
Figure 7:
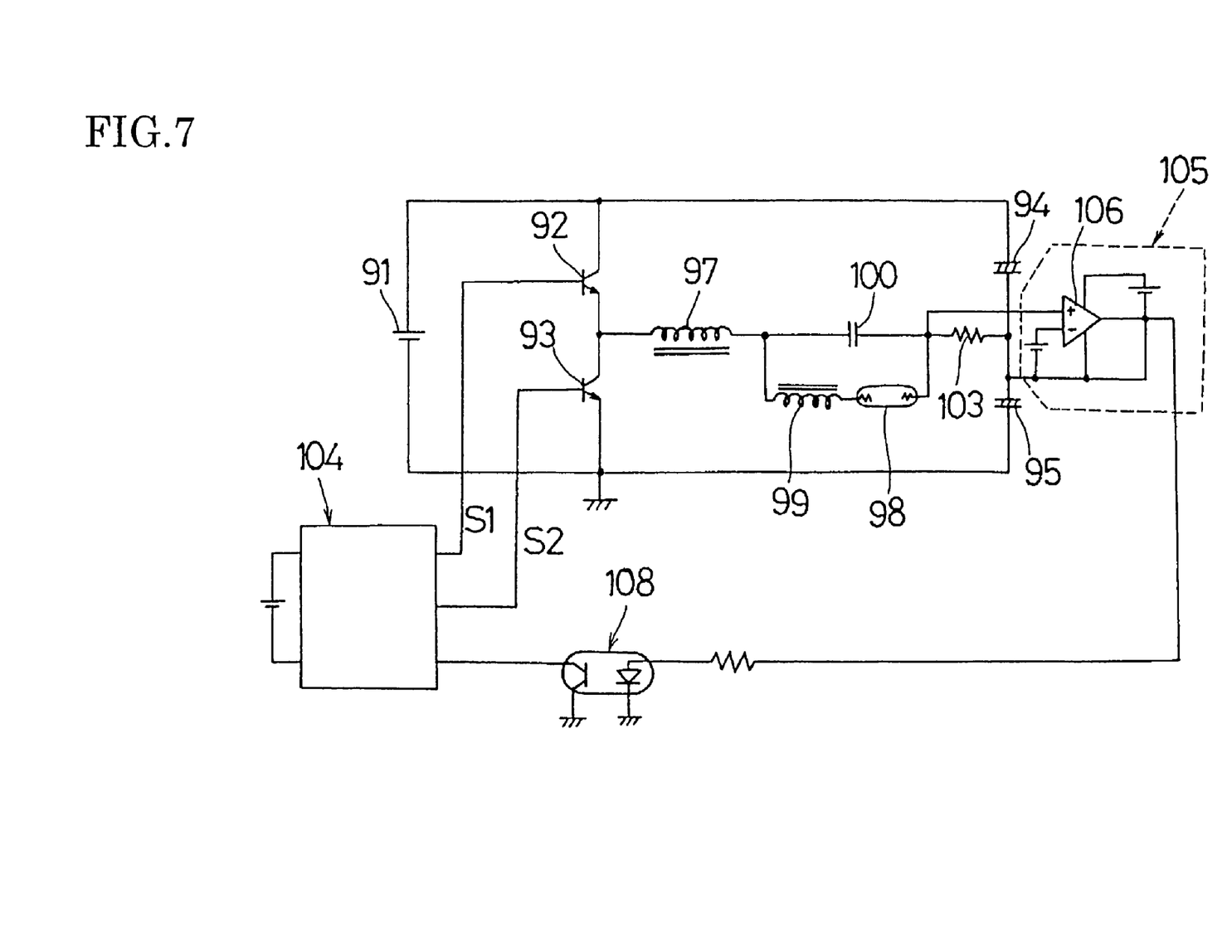
FIG. 7 is a circuit diagram showing another conventional example.

A circuit, which controls a current value flowing to a switching device through turning on and off this switching device, includes, for example, a boosting chopper circuit employing an active-filter as shown in FIG. 6 and a half-bridge type HID lighting circuit as shown in FIG. 7. In this kind of circuit, it is necessary to detect the current flowing to the switching device and to perform on-off control of the switching device based on the detected current value. Therefore, it becomes the matter how the current flowing to the switching device is detected.

Namely, according to a boosting chopper circuit employing the active-filter as shown in FIG. 6, a DC power supply (84) is constituted by an AC power supply (81) and a full-wave rectifying circuit (82), a choke coil (85) and a switching device (semiconductor switch) (86) are connected in series between output-terminals of the DC power supply (84), and a series circuit of a diode (87) and a capacitor (88) is connected to the both ends of the switching device (86) in parallel, so that electromagnetic energy is accumulated to the choke coil (85) by performing the on-off operation of the switching device (86) and emitted into the capacitor (88) through the diode (87), thereby accumulating a higher voltage than a voltage obtained by rectifying the AC power supply (81) through the full-wave rectifying circuit (82) to the capacitor (88).

A switch control circuit (89) detects the current flowing to the switching device (86) through a resistor (for example, 1 ohm) (90), produces an output of the ON signal (S), which is high voltage (H), to the switching device (86), brings the switching device (86) to be turned on while producing the output of the ON signal (S) (the output signal is becoming to high voltage (H)), and brings the switching device (86) to be turned off by shutting off the ON signal (S) (the output signal is becoming to low voltage (L)).

And, the switch control circuit (89) starts producing an output of the ON signal (S) (turning on the switching device (86)) when the current of choke coil (85) and the diode (87) becomes 0, and shuts off the ON signal (S) (turns off the switching device (86)) when the current flowing to the switching device (86) detected through the resistor (90) reaches the threshold corresponding to the peak value of the current of the desired choke coil (85). Therefore, stable DC voltage is obtained on the side of the capacitor (88) through performing on-off control in high frequency on the switching device (86).

Moreover, according to a half-bridge type HID lighting circuit as shown in FIG. 7, a series circuit of a pair of switching devises (92, 93) is connected between output-terminals of a DC power supply (91) and a series circuit of a pair of capacitors (94, 95) is also connected between them, and a choke coil (97), a HID lamp (98), a choke coil (99) and a capacitor (100) are connected between a midpoint of the pair of switching devices (92, 93) and a midpoint of the pair of capacitor (94, 95). Additionally, a resistor (103) (for example, 1 ohm) is connected between the capacitor (100) and the midpoint of the pair of capacitors (94, 95). The HID lamp (98) is lit up by making the pair of switching device (92, 93) perform on-off operation in an alternating sequence through a switch control circuit (104) based on the current flowing to the pair of switching devices (92, 93) detected by the resistor (103).

However, according to the conventional current detecting circuit as shown in FIG. 6, the resistor (90) connected with the switching device (86) in series detects the current flowing to the switching device (86). Therefore, there are problems that false detection and power loss might occur because spike-like noise is developed by the inductance content of the resistor detecting the current flowing to the switching device (86).

More specifically, where the current flowing to the switching device (86) is set to I, the voltage between the both ends of resistor (90) is set to V, and the resistance of the resistor (90) is set to R, the current flowing to the switching device (86) is detected as the voltage according to the V=IR relation. Therefore, the detecting voltage is enabled to be higher by increasing voltage (resistance R). However, power loss will occur in the resistor (90) because of the relation of W=IV where the power loss in the resistor (90) is set to W. Although the power loss in the resistor (90) is reduced by decreasing the voltage (resistance R), the detecting voltage becomes lower. Therefore, it becomes difficult to detect the detecting voltage with high accuracy because of the noise when the noise level is high.

Moreover, according to the conventional current detecting circuit as shown in FIG. 7, since the current flowing to the pair of switching devices (92, 93) is detected through the resistor (103), in addition to the similar problems as the case of the circuit in FIG. 6, it is necessary to provide a current detecting circuit (105) with such as a comparator circuit (106), and to insulate between the current detecting circuit (105) and the switch control circuit (104) through the use of, for example, a photocoupler (108) to carry the current detecting signal to the switch control circuit (104).

Figure 8:
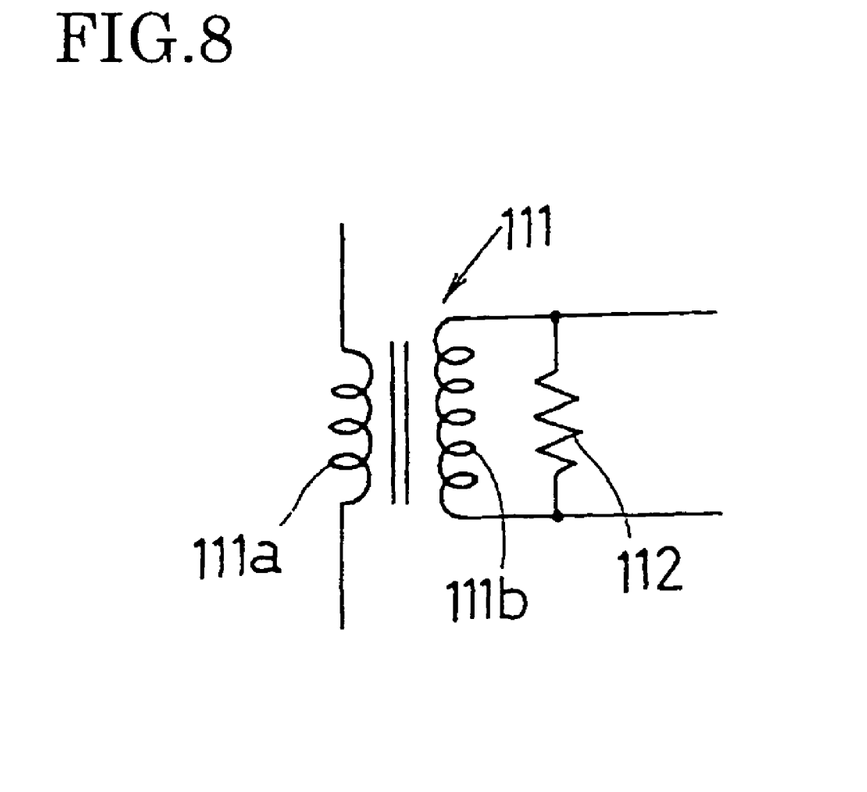
FIG. 8 is a circuit diagram showing another conventional example.

In addition, according to the method of detecting current flowing to the switch device as shown in FIG. 8, it is possible to detect the current at both ends of a resistor (112) provided to a secondary coil (111b) of a current transformer (111) which is constituted by a primary coil (111a) and the secondary coil (111b). In this case, although it is possible to detect the current with high voltage converted from small current, with low power loss, and in an insulated form by making more number of turns of secondary coil (111b) than those of primary coil (111a), there is a problem that it is impossible to detect the DC content.

Figure 9:
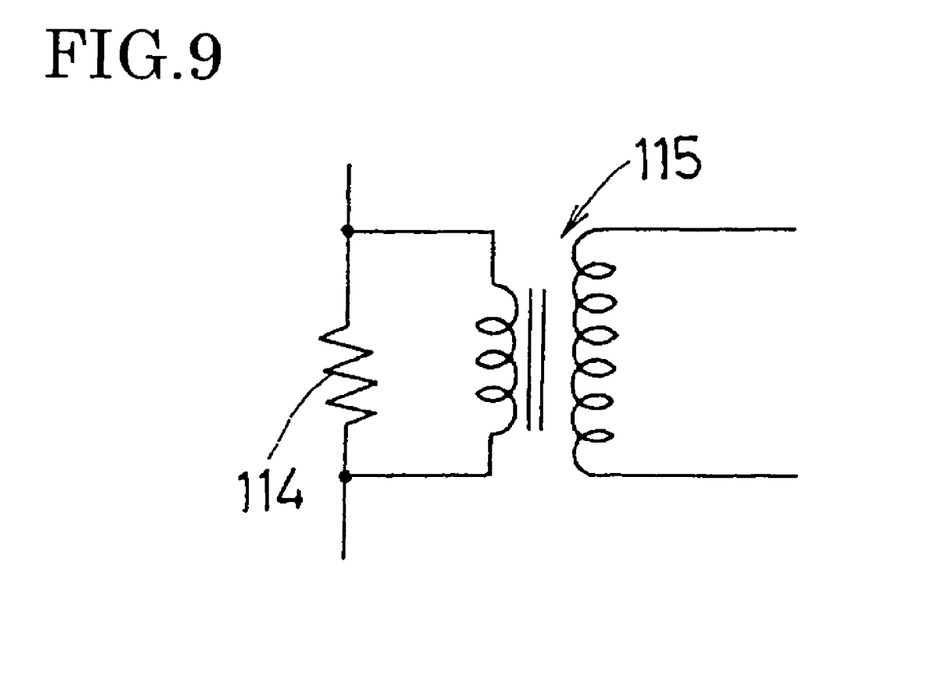
FIG. 9 is a circuit diagram showing another conventional example.

Moreover, as shown in FIG. 9, it is possible to detect the current through a resistor (114) provided to the switching device in series, and to multiply the voltage through a transformer (115). Although this circuit has similar effects as the circuit shown in FIG. 8, there is a problem that it is impossible to detect the DC content.

Furthermore, although a method of detecting DC content by use of a hall device has been in practical use, there is a problem that the cost of this case becomes more expensive due to a lot of components used in the circuit.

Therefore, in view of the above-mentioned problems, an object of this invention is to provide a current detecting circuit, in which the current flowing to a switching device is enabled to be detected with high accuracy, with low power loss, with high voltage, and in an insulated form. Patent reference 1: JP,7-231650, A

DISCLOSURE OF THE INVENTION

This invention has instituted following technical means to accomplish the above-mentioned object.

Specifically, a circuit, in which a current flowing to a switch device also flows to a choke coil which is a component of the circuit, includes a charge circuit charging a capacitor through a current which is proportional to a voltage developed in the choke coil, and a discharge circuit setting the voltage of the capacitor to 0V when the current flowing to the switching device is 0, and the circuit is capable of detecting the voltage of the capacitor as a value which is proportional to the current flowing to the switching device.

According to another technical means of this invention, a circuit, in which a choke coil and a switching device are connected in series between output-terminals of a DC power supply and a series circuit of a diode and a capacitor is connected to both ends of the switching device in parallel, so that electromagnetic energy is accumulated to the choke coil by on-off operation of the switching device and emitted into the capacitor through the diode to obtain DC voltage, includes a charge circuit charging the capacitor through a current which is proportional to a voltage developed in the choke coil, and a discharge circuit setting the voltage of the capacitor to 0V when the current flowing to the switching device is 0, and the circuit is capable of detecting the voltage of the capacitor as a value which is proportional to the current flowing to the switching device.

In addition, according to another technical means of this invention, a circuit of a half-bridge type HID lighting circuit, in which a series circuit of a pair of switching devises is connected between output-terminals of a DC power supply and a series circuit of a pair of capacitors is also connected between them, and a choke coil and a HID lamp are connected between a midpoint of the pair of switching devices and a midpoint of the pair of capacitors, so that the HID lamp is lit up in high frequency by making the pair of switching devices perform on-off operation in an alternating sequence, includes a charge circuit charging the capacitor through a current which is proportional to a voltage developed in the choke coil, and a discharge circuit setting the voltage of the capacitor to 0V when both of the pair of switching devices are turned off, and the circuit is capable of detecting the voltage of the capacitor as a value which is proportional to the current flowing to the switching devices.

BEST MODE FOR CARRYING OUT THE INVENTION

Hereafter, preferred embodiments of the invention is explained referring to the drawings.

Figure 1:
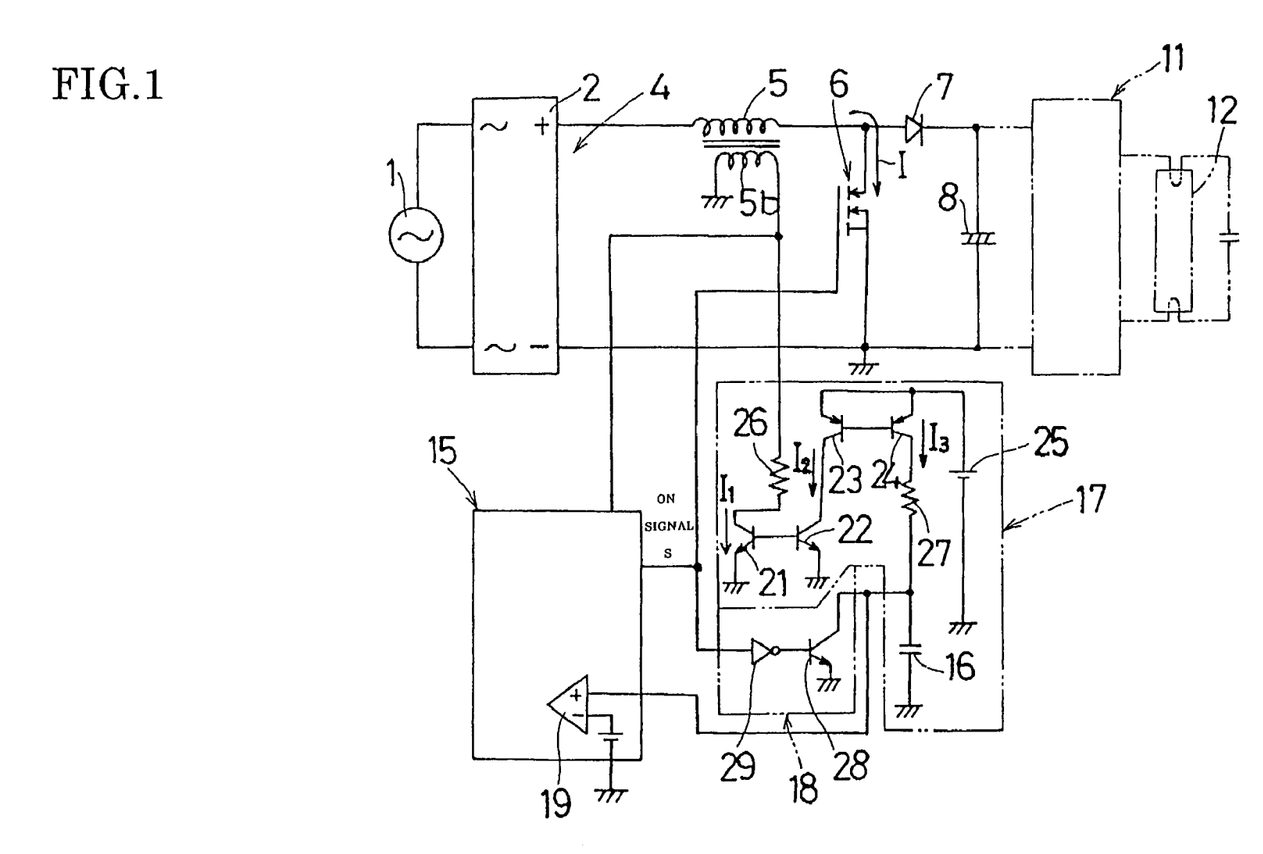
FIG. 1 is a circuit diagram showing an embodiment of the invention.

FIG. 1 shows an embodiment employing this invention in a boosting chopper circuit utilizing an active-filter. In this diagram, 1 is a commercial AC power supply, and 2 is a full-wave rectifying circuit which rectifies the AC power supply (1) and is constituted by a diode-bridge. A DC power supply (4) is constituted by the AC power supply (1) and the full-wave rectifying circuit (2).

5 is a choke coil and 6 is a switching device (a semiconductor switch), which are constituted by, for example, a metal oxide semiconductor field effect transistor (MOSFET). The choke coil (5) and the switching device (6) are connected between output-terminals of the DC power supply (4) in series. A series circuit of a diode (7) and a capacitor (8) is connected to both ends of the switching device (6) in parallel. The DC power supply (4), the choke coil (5), the switching device (6), the diode (7), and the capacitor (8) constitute an active filter, in which electromagnetic energy is accumulated to the choke coil (5) by performing on-off operations of the switching device (6) in high-frequency, and then the energy is emitted into the capacitor (8) through the diode (7), whereby a higher voltage than a voltage obtained by rectifying the AC power supply (1) through the full-wave rectifying circuit (2) is accumulated to the capacitor (8).

As shown by chain-dotted line in FIG. 1, a discharge lamp lighting device, which brings a discharge lamp (12) into high frequency lighting, is constituted by connecting the discharge lamp (12) to the output-end side of the capacitor (8) through a inverter circuit (11) as a load of the boosting chopper circuit (active filter).

And, a switch control circuit (15) controlling on-off operation of the switching circuit (6), a charge circuit (17) charging a capacitor (16) through a current which is proportional to the voltage developed in the choke coil (5), and a discharge circuit (18) discharging to bring the voltage of the capacitor (16) to 0V when the current flowing to the switching device (6) is 0, are provided, and a secondary coil (5b) is provided to the choke coil (5).

The switch control circuit (15) produces an output of an ON signal (S), which is high voltage (H), to the switching device (6) to turn on the switching device (6) while producing the output of the ON signal (S) (the output signal is becoming to high voltage (H)), and shuts off the ON signal (S) (the output signal is becoming to be low voltage (L)) to turn off the switching device (6).

Figure 2:
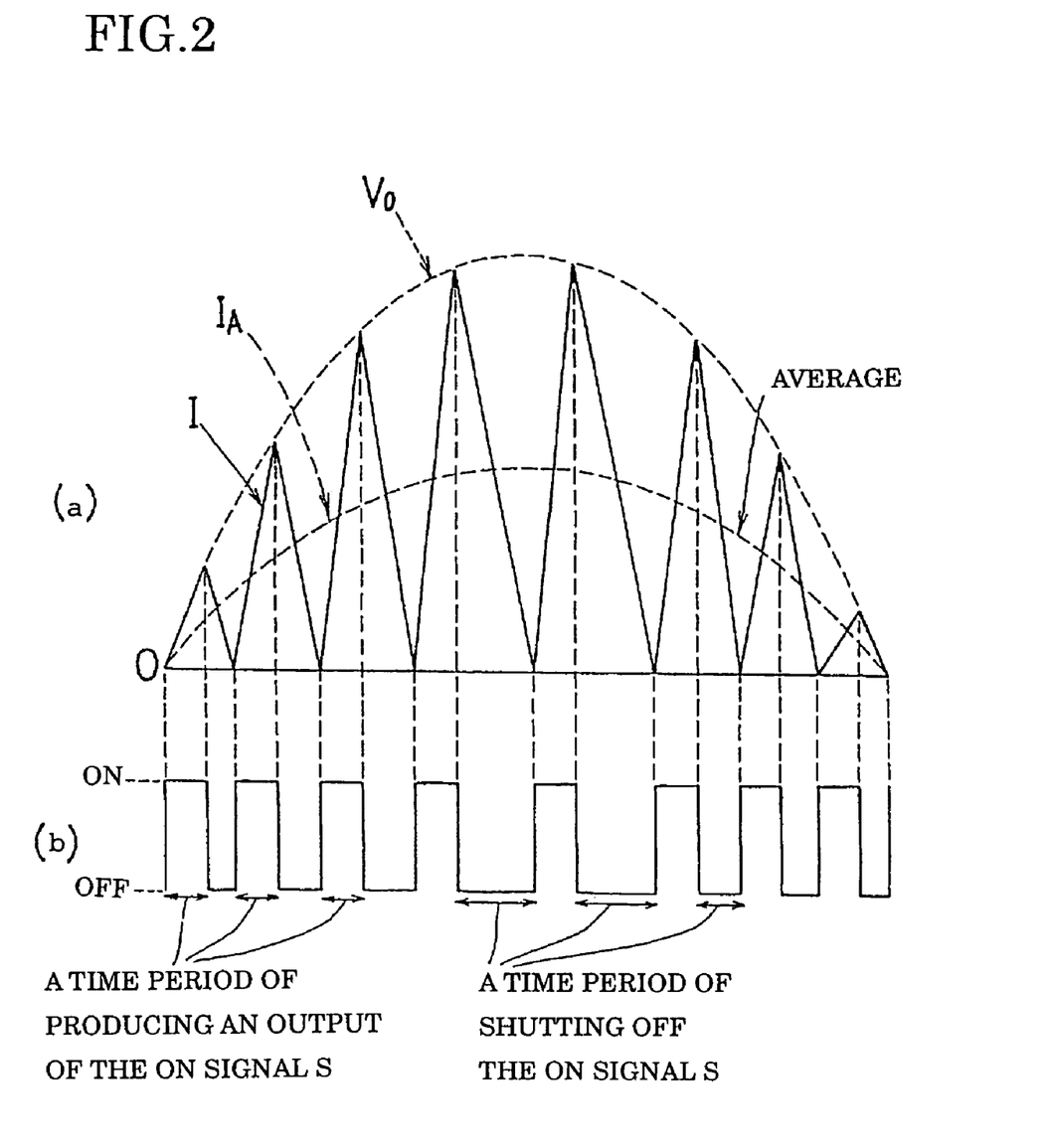
FIG. 2 is a waveform diagram explaining an operation of the invention.

And, the switch control circuit (15) including such as a comparator (19), as shown in FIG. 2, starts producing an output of the ON signal (S) (turns on the switching device (6)) when a current (I) flowing to the choke coil (5) becomes 0, compares a current (I) flowing to the switching device (6) detected through the charge circuit (17) with a reference voltage ($V_0$), which is shaped like sine wave at a designated frequency, then shuts off the ON signal (S) (turns off the switching device (6)) when the current (I) flowing to the switching device (6) reaches the reference voltage ($V_0$), whereby stable DC voltage is obtained on the side of the capacitor (8) through performing on-off control in high frequency on the switching device (6).

According to FIG. 2, FIG. 2(a) shows the waveform of the current (I) flowing to the switching device (6), FIG. 2(b) shows a gate-voltage waveform of the switching device (6), and $I_A$ in FIG. 2(a) shows average values of the current (I) flowing to the switching device (6), and the current ($I_A$) is an input current passed through the choke coil (5) side from the DC power supply (4).

A charge circuit (18) includes a capacitor (16), a pair of switching devices (transistors) (21, 22) constituting a Millar circuit, another pair of switching devices (transistors) (23, 24)

constituting another Millar circuit, a DC power supply (25), and resistors (26, 27). A discharge circuit (18) includes a transistor (28) and a NOT circuit (29), and is constituted in a manner that the transistor (28) is turned on to discharge the capacitor (16) when the switch control circuit (15) shuts off the ON signal (S).

According to above described embodiment, a current ($I_1$) flowing to the switching device (21) is equal to a current ($I_2$) flowing to the switching device (22) ($I_1=I_2$), because the pair of switching devices (21, 22) in the charge circuit (17) constitutes the Millar circuit. Moreover, since the pair of switching devices (23, 24) also constitutes the Millar circuit, the current ($I_2$) flowing to the switching device (23) is equal to a current ($I_3$) flowing to the switching device (24) ($I_2=I_3$). And since the current ($I_1$) flowing to the switching device (21) is equal to the current flowing to the secondary coil (5b) of the choke coil (5) and is proportional to the current (I) flowing to the choke coil (5) and the switching device (6), the current ($I_3$) flowing to the capacitor (16) is corresponding to or proportional to the current (I) flowing to the choke coil (5) and the switching device (6).

Therefore, the relationship between a voltage ($V_L$) developed in the choke coil (5) and the current (I) flowing to the choke coil (5) is shown as follows.

Where the voltage of the capacitor (16) is set to $V_c$, the capacitance of the capacitor (16) is set to C, the resistance of the resistor (26) is set to R, and the inductance of the choke coil (5) is set to L:

$$Vc = \int (I \times C) dt / C \quad (1)$$
$$= \int (V_L/R) dt / C$$
$$= \int V_L dt (R \times C)$$

$V_L = L di/dt$ $V_L dt = L di$ $$\int V_L dt = \int L di = L \times I \quad (2)$$

According to the equations (1) and (2), $Vc = I \times L/(R \times C)$.

Therefore, the voltage ($V_c$) of the capacitor (16) takes on the value which is proportional to the current (I) flowing to the switching device (6).

In the discharge circuit (18), the transistor (28) is held in its ON state to keep the voltage ($V_c$) of the capacitor (16) at 0V until the switching device (6) is turned on, and charging is started to the capacitor (16) from 0V when the switching device (6) is turned on. As a result, the current (I) flowing to the switching device (6) becomes perfectly proportional to the voltage ($V_c$) of the capacitor (16) to prevent developing the offset of the DC content. More specifically, although the current (I) flowing to the choke coil (5) (switching device (6)) is a value which is obtained by adding a constant to the integral of the choke voltage, since the integration is performed after the integral is cleared to 0 when the current (I) starts flowing to the choke coil (5), the constant becomes 0. Then the voltage ($V_c$) of the capacitor (16) is enabled to use as the value of the current (I) flowing to the switching device (6). Moreover, errors are not piled up since the integral is reset every time when the current starts flowing.

Therefore, the current (I) flowing to the switching device (6) is enabled to be detected with high accuracy, with low power loss, with high voltage and in an insulated form through such as the secondary coil (5b) of the choke coil (5).

Figure 3:
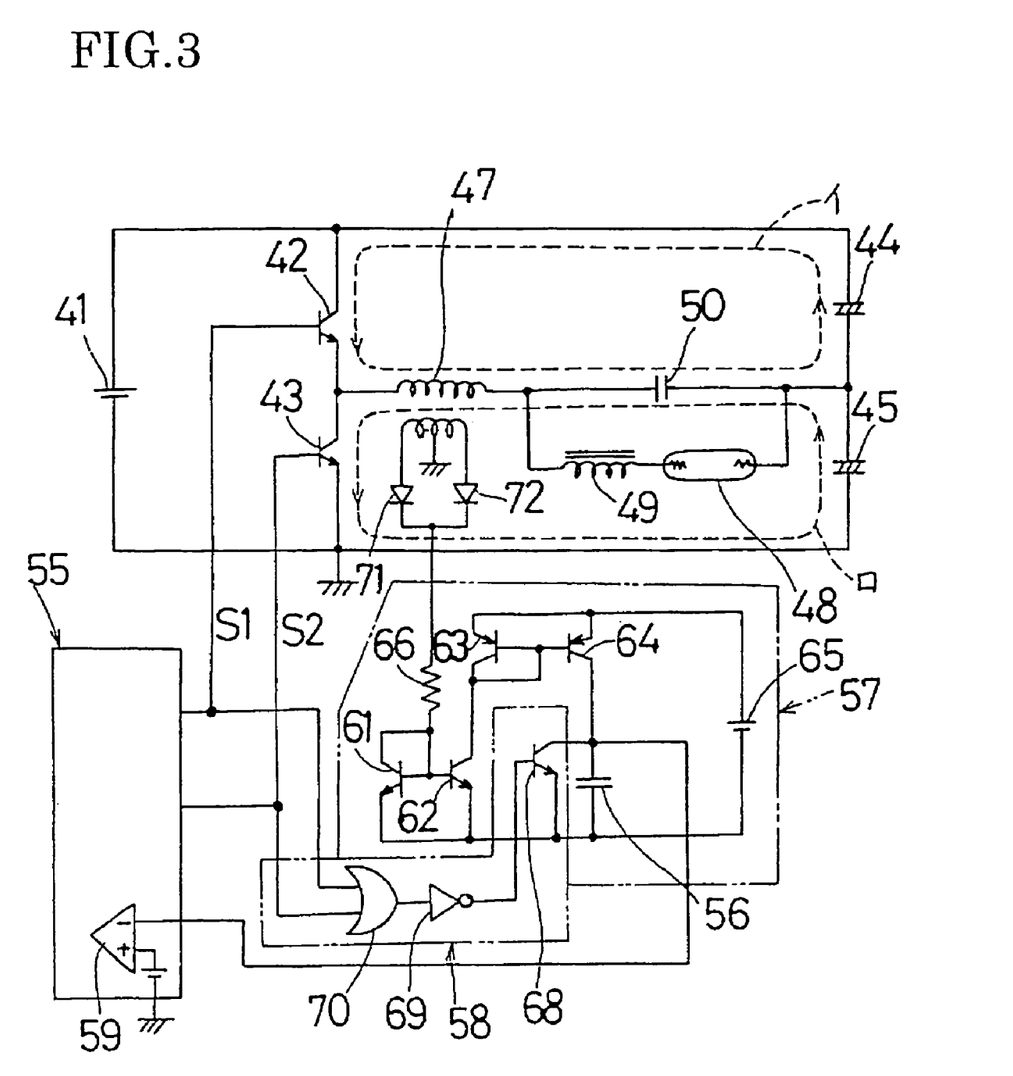
FIG. 3 is a circuit diagram showing another embodiment.

FIG. 3 shows another embodiment, in which this invention is employed in a half-bridge type HID lighting circuit. According to FIG. 3, 41 is a DC power supply, and a series circuit of a pair of switching devices (42, 43) is connected between the output-terminals of the DC power supply (41) and a series circuit of a pair of capacitors (44, 45) is also connected between them. A choke coil (47), a HID lamp (48), a choke coil (49) and a capacitor (50) are connected between the midpoint of the pair of the switching devices (42, 43) and the midpoint of the pair of the capacitor (44, 45). Here, the HID lamp stands for high intensity discharge lamp, and is a generic name for a high-pressure mercury lamp, a metal halide lamp, and a sodium-vapor lamp. The HID lamp is also called as a high-intensity discharge lamp, and is characterized by its compact body, high power, high efficiency, and long life.

And a switch control circuit (55) performing on-off control on the switching devices (42, 43), a charge circuit (57) charging a capacitor (56) through a current, which is proportional to the voltage developed at the choke coil (47) and a discharge circuit (58) discharging to bring the voltage of the capacitor (56) to 0V while both ON signals (S1) and (S2) are shut off (both of output signals to the switching devices (42, 43) is held at low voltage (L)) are provided, and a secondary coil (42b) is provided to the choke coil (42).

The switch control circuit (55) is configured to produce the output of the ON signals (S1) and (S2), which are high voltage (H), to the switching device (42, 43) to bring the switching device (42) to be turned on, during producing the output of the ON signal (S1) (the output signal to the switching device (42) is becoming to high voltage (H)), to bring the switching device (42) to be turned off by shutting off the ON signal (S1) (the output signal to the switching device (42) is becoming to low voltage (L)), moreover, to bring the switching device (43) to be turned on during producing the output of the ON signal (S2) (the output signal to the switching device (43) is becoming to high voltage (H)), and to bring the switching device (43) to be turned off by shutting off the ON signal (S2) (the output signal to the switching device (43) is becoming to low voltage (L)).

Figure 5:
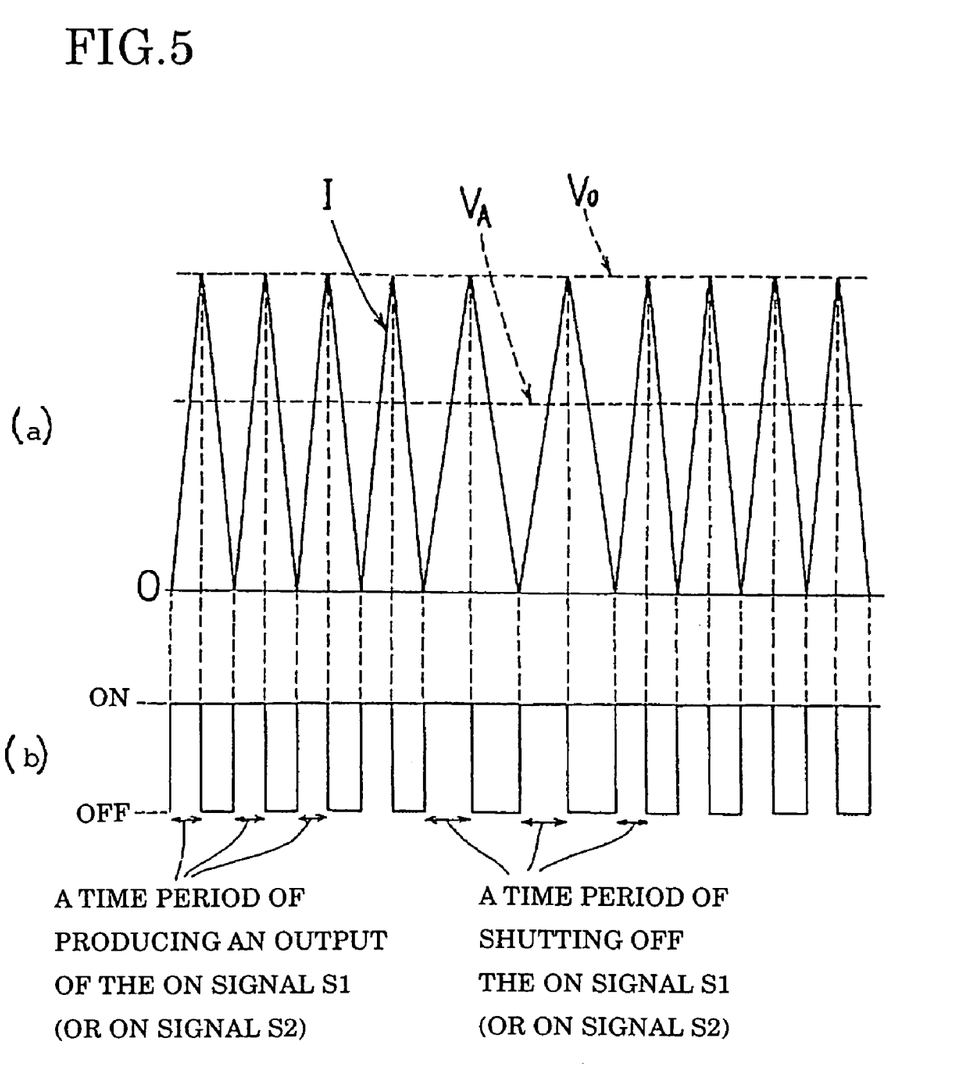
FIG. 5 is another waveform diagram explaining an operation of the invention.

Furthermore, the switch control circuit (55) including such as a comparator (59), as shown in FIG. 5, starts producing an output of the ON signal (S1) or the ON signal (S2) (turns on the switching device (42) or the switching device (43)) when the current (I) flowing to the choke coil (47) becomes 0, compares the current (I) flowing to the switching device (42) or the switching device (43) detected through the charge circuit (57) with the reference voltage ($V_0$) which is the designated DC voltage, and then shuts off the ON signal (S1) or the ON signal (S2) (turns off the switching device (42) or the switching device (43)) when the current (I) flowing to the switching device (42) or the switching device (43) reaches the reference voltage ($V_0$).

In FIG. 5, FIG. 5(a) shows a current waveform of the current (I) flowing to the switching device (42) (or the switching device (43)), FIG. 5(b) shows a voltage waveform of the switching device (42) (or the switching device (43)), and ($I_A$) in FIG. 5(a) shows the average value of the current (I) flowing to the switching device (42) (or the switching device (43)), and the current ($I_A$) is a lamp current supplied from the DC power supply (41) side to the HID lamp (48) side.

Figure 4:
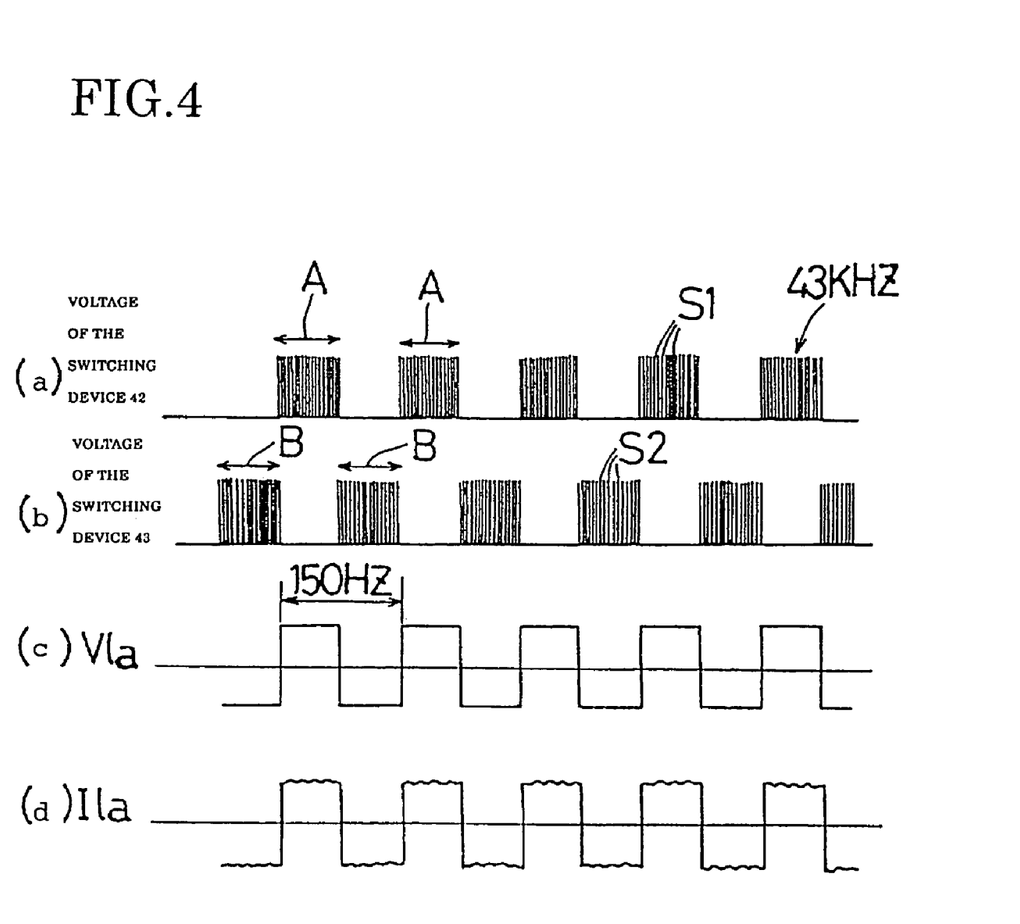
FIG. 4 is a waveform diagram explaining an operation of the invention.

And, the switch control circuit (55), as shown in FIG. 4, controls a time period (A) producing the output of the ON signal (S1) and a time period (B) producing the out put of the ON signal (S2) to make them repeat alternatively, thereby alternatively repeating the on-off operation of the switching device (42) and that of the switching device (43), so that an AC lamp voltage ($V_{la}$) is applied to the HID lamp (48) to flow an AC lamp current ($I_{la}$) so as to stably light up the HID lamp (48).

In FIG. 4, FIG. 4(a) shows a voltage waveform of the switching device (42), FIG. 4(b) shows a voltage waveform of the switching device (43), FIG. 4(c) shows a waveform of the lamp voltage ($V_{la}$) of the HID lamp (48), and FIG. 4(d) shows a waveform of the lamp voltage ($I_{la}$) of the HID lamp (48).

A charge circuit (57) includes a capacitor (56), a pair of switching devices (transistors) (61, 62) constituting a Millar circuit, another pair of switching devices (63, 64) constituting another Millar circuit, a DC power supply (65) and a resistor (66). The resistor (66) included among the charge circuit (57) is connected to the both ends of the secondary coil (42b) through diodes (71, 72), respectively. A discharge circuit (58) includes a transistor (68), a NOT circuit (69), and a OR circuit (70), and is constituted in a manner that the transistor (68) is turned on to discharge the capacitor (56) when the switch control circuit (55) shuts off both of the ON signal (S1, S2) (both of the pair of switching devices (42, 43) are turned off).

According to the above-mentioned embodiment, the voltage ($V_c$) becomes the value which is proportional to the current (I) flowing to the switching devices (42, 43) as in the case of the embodiment in FIG. 1. And regarding to the discharge circuit (58), the transistor (68) is held in its ON state to keep the voltage ($V_c$) of the capacitor (50) at 0V when both of the switching devices (42, 43) are in OFF state, and charging is started to the capacitor (56) from 0V when one of the switching devices (42, 43) is turned on. As a result, the current flowing to the switching devices (42, 43) becomes perfectly proportional to the voltage ($V_c$) of the capacitor (16) to prevent developing the offset of the DC content. Therefore, the current (I) flowing to the switching devices (42, 43) is enabled to be detected with high accuracy, with low power loss, with high voltage and in an insulated form through such as the secondary coil (5b) of the choke coil (47).

And as shown in FIGS. 4(a) and (b), the switching device (42) is performed on-off operation during the time period (A) to flow the current (✓)indicated as the broken line in FIG. 3, and the switching device (43) is performed on-off operation during the time period (B) to flow the current (□) indicated as the broken line in FIG. 3. As a result, as shown in FIGS. 4(c) and (d), an AC lamp voltage ($V_{la}$) is applied to the HID lamp (48) to flow an AC lamp current ($I_{la}$) so as to stably light up the HID lamp (48).

INDUSTRIAL APPLICABILITY

It is possible to use as a current detecting circuit detecting a current flowing to a switching device.

The invention claimed is:

1. A current detecting circuit of a half-bridge type HID lighting circuit comprising:
    a main circuit including:
    a first DC power supply;
    a series circuit of a pair of main switching devices, the series circuit of the pair of main switching devices being connected between output-terminals of the first DC power supply;
    a series circuit of a pair of first capacitors, the series circuit of the pair of first capacitors being connected between the output-terminals of the first DC power supply;
    a choke coil;
    a secondary coil connected to diodes; and
    a HID lamp, wherein the choke coil and the HID lamp are connected between a midpoint of the pair of main switching devices and a midpoint of the pair of first capacitors, so that the HID lamp is lit up by making the pair of main switching devices perform on-off operations in an alternating sequence,
    a charge circuit charging a second capacitor through a current which is proportioned to a voltage developed in the choke coil, the charge circuit including:
    a second DC power supply;
    a resistor, the resistor being connected to the both ends of the secondary coil through the diodes, respectively;
    a first pair of switching devices constituting a first Miller circuit, the first pair of switching devices being connected to the resistor and the second DC power supply; and
    a second pair of switching devices constituting a second Miller circuit, the second pair of switching devices being connected to the first pair of switching devices and the second DC power supply; and
    a discharge circuit setting a voltage of the second capacitor to 0V when both of the pair of main switching devices are turned off,
    wherein the charge circuit detects the voltage of the second capacitor as a value which is proportioned to the current flowing to the main switching devices.

2. The current detecting circuit of claim 1, further comprising a switch control circuit performing on-off control on the switching devices,
    wherein the switch control circuit is capable of communicating ON signals with the pair of main switching devices and with the discharge circuit, and
    wherein the pair of main switching devices are turned off when ON signals are shut off.

3. The switch control circuit of claim 2, wherein the switch control circuit includes a comparator connected to the charge circuit.

4. The current detecting circuit of claim 2, wherein the discharge circuit includes:
    a transistor;
    an inverting circuit connected to the transistor: and
    an OR circuit connected to the inverting circuit,
    wherein the discharge circuit is constituted in a manner that the transistor is turned on to discharge the second capacitor when the switch control circuit shuts off both of the ON signals.

5. A current detecting circuit of a half-bridge type HID lighting circuit comprising:
    a main circuit including:
    a first DC power supply;
    a series circuit of a pair of switching devices, the series circuit of the pair of switching devices being connected between output-terminals of the first DC power supply;
    a series circuit of a pair of first capacitors, the series circuit of a pair of first capacitors being connected between the output-terminals of the first DC power supply;
    a choke coil;
    a secondary coil connected to diodes; and
    a HID lamp, wherein the choke coil and the HID lamp are connected between a midpoint of the pair of switching devices and a midpoint of the pair of first capacitors, so that the HID lamp is lit up by making the pair of switching devices perform on-off operations in an alternating sequence;

a charge circuit charging a second capacitor through a current which is proportional to a voltage developed in the choke coil; and a discharge circuit setting a voltage of the second capacitor to 0V when both of the pair of switching devices are turned off, the discharge circuit including:

a transistor;

an inverting circuit connected to the transistor; and an OR circuit connected to the inverting circuit; and a switch control circuit performing on-off control on the switching devices, wherein the charge circuit detects the voltage of the second capacitor as a value which is proportional to the current flowing to the switching devices, wherein the switch control circuit is capable of communicating ON signals with the pair of switching devices and with the discharge circuit, wherein the pair of switching devices are turned off when ON signals are shut off, and wherein the discharge circuit is constituted in a manner that the transistor is turned on to discharge the second capacitor when the switch control circuit shuts off both of the ON signals.

6. The switch control circuit of claim 5 wherein the switch control circuit includes a comparator connected to the charge circuit.

\* \* \* \* \*